Feb. 5, 1952      F. G. HANSEN      2,584,201

VARIABLE SPEED TRANSMISSION

Filed Jan. 6, 1949

Fred G. Hansen
INVENTOR.

BY Geo E Kirk
Atty

Patented Feb. 5, 1952

2,584,201

UNITED STATES PATENT OFFICE 2,584,201

VARIABLE SPEED TRANSMISSION

Fred G. Hansen, Toledo, Ohio

Application January 6, 1949, Serial No. 69,456

2 Claims. (Cl. 74—112)

This invention relates to changing speed between a driving and driven shaft, adapted to embody features of speed reduction and angle drive.

This invention has utility when incorporated in an adjustable angle rockable disk actuator for an intermittent grip device, wherein there is a manually adjustable arm for positively setting the driving inclination of the disk, thereby to vary the throw angle for an intermittent grip device pick-up arm, and wherein with a pair of arms there is approach to continuous speed for the driven shaft from a constant speed drive shaft.

Referring to the drawings.

Figure 2:
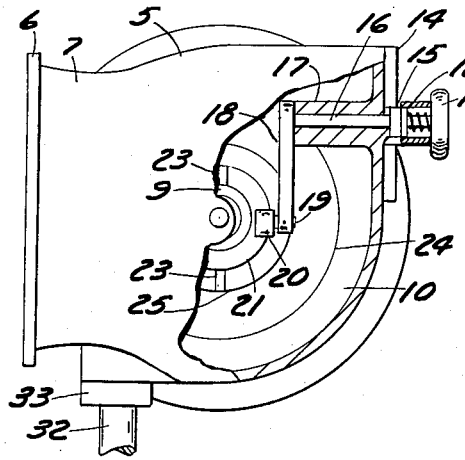
Fig. 2 is an end elevation, looking from the left of Fig. 1, with a portion broken away to show further features of the control.
Figure 1:
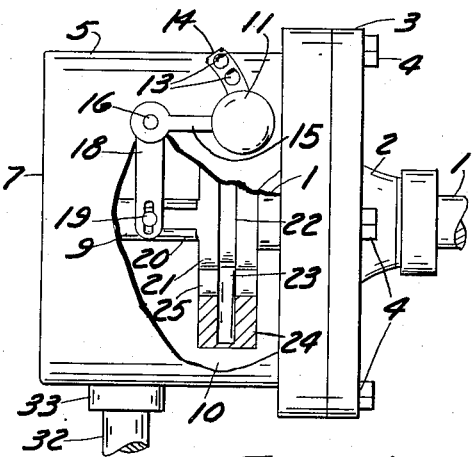
Fig. 1 is a plan view, with parts broken away, of an embodiment of the invention, showing features of the manual control.
Figure 3:
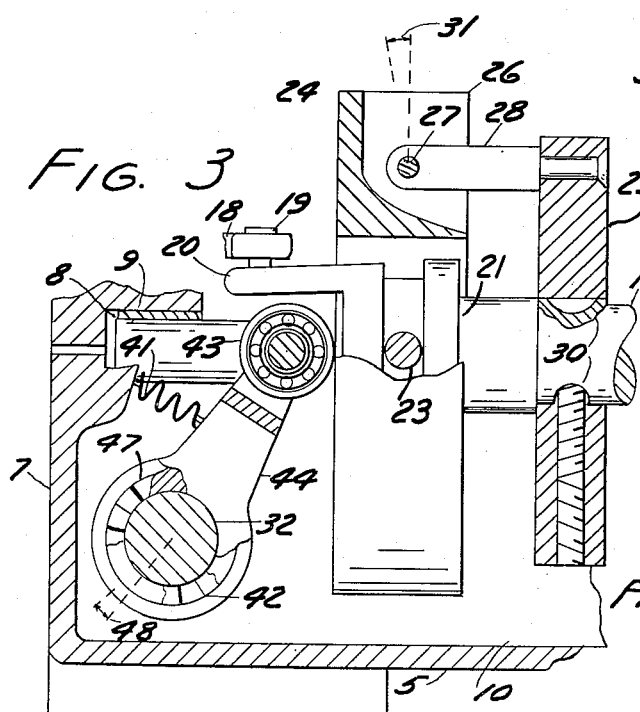
Fig. 3 is a partial vertical section of the transmission unit between the driving and driven shafts.
Figure 4:
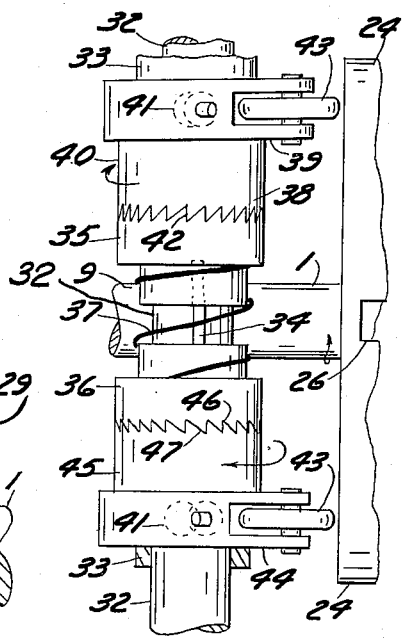
Fig. 4 is a fragmentary plan view of features of the intermittent grip device therefor.

A driving shaft 1, driven say in the range of 250 R. P. M., extends thru a bearing 2 on a housing flange 3 having connection by bolts 4 with a main housing section 5 on a base 6. The housing section 5 has opposite from its open end at the flange 3, an end wall or closure 7 having a bearing 8 aligned with the bearing 2. Reduced diameter portion 9 of the shaft 1 is in the bearing 8. Between the flange 3 and the end wall 7, the driving shaft 1, 9, is in-board enclosed and operating in a chamber 10.

On the top of the housing 5 is a pull pin 11 against the resistance of compressed helical spring 12, accordingly acting normally to hold the lower end of the pin 11 seated in a stop or recess 13 of an arc way 14 on the top of the housing 5. The pin 11 is at the free end of an arm 15 fixed with a stem 16 thru a bearing 17 in the housing 5. At its lower end, the stem 16 has fixed therewith a second arm 18. The assembly is a sort of bell-crank lever of fixed axis in the housing 5, for the swinging of the pin 11 to shift the free end of the arm 18 in the chamber 10. A pivot pin 19 connects the arm 18 slotted free end with an extension 20 of a yoke or sleeve 21, freely slidable along the shaft 1 toward and from the flange 3.

Intermediate its longitudinal extent, the sleeve 21 has on its outer side an endless groove or way 22 adapted to be engaged by a pair of diametrically disposed pins 23, radially of and fixed with an actuator disk 24, herein shown with a central opening 25 sufficiently clear of the sleeve 21 to respond to tilting operations.

At 90° spacing from and herein shown as opening upwardly from the horizontally extending aligned pins 23, the disk 24 has a recess 26 at which a pivot pin 27 serves as a fulcrum, as held by an arm 28 fixed with a carrier disk 29. Keying means 30 have transmission-effective holding anchoring action for the disk 29 in maintaining the arm 28 parallel to the axis of the shaft 1. The rotation of the driving shaft 1, accordingly carries the fulcrum arm 28 and its pin 27 in a circular orbit. The tilt-control pins 23, establish an angle of tilt, say thru a range 31. The line of direction of the pins 23 is parallel to the axis at the fulcrum pin 27. A radius of the shaft 1 to the fulcrum pin 27 is at right angles to the diameter of the shaft 1 locating the mid position of the sleeve 21 for the pins 23.

A driven shaft 32 is located in bearings 33 in the housing 5. In the chamber 10, the shaft 32 has a spline 34 to key sleeve toothed-clutch sections 35, 36, for rotation with the shaft 32. The sections 35, 36, are yieldably thrust apart by a compression helical spring 37.

In downward swinging of the arm 39 as actuated by compression helical spring 41, radial complementary clutch teeth 42 of the sleeve 40 disengage the clutch teeth 38 of the sleeve section 35. This downward swing of the arm 39 is with its free end anti-friction bearing ring 43 riding against the radial face of the disk 24. Of course, there is no upward and downward swing unless the disk 24 is at an inclination to the shaft 1. Accordingly, by adjusting the pin 11 in the quadrant or arc way 14 to locate the disk 24 at no-slant position as to the shaft 1, there is stopping of the driven shaft 32, for there is no resulting rocking for the arm 39, or its companion arm 44.

The free end of the arm 44 carries an anti-friction bearing ring 43 to ride on the face of the disk 24 diametrically from the ring 43 on the arm 39. A compression spring 41 holds the arm 44 with its bearing 43 at all times against the face of the disk 24. The arm 44 is fixed with a sleeve section 45 having clutch teeth 46 conversely to the radial clutch teeth 38 of the axially aligned sleeve 35. Complementary clutch teeth 47 to the teeth 46 are on the splined slidable sleeve 36 on the driven shaft 32, on which the sleeve section 45 is loose. Clockwise rotation of the shaft 1 causes the inclined disk 24 to swing the arm 44 upward, as the spring 37 allows the clutch 38, 42, to release. This clutch 46, 47, automatically releases when the clutch 38, 42, acts. A rocking range 48 may serve for a driven speed up to 20 R. P. M.

It is to be noted that the driving shaft 1 may be continuously running, and by so shifting the control pin 11 that the endless track disk 24 has no slant relatively to the axis of the shaft 1, the anti-friction bearing rings 43 at the free ends of the arms 39, 44, of the intermittent grip device, have no swing or oscillation movement and the shaft 32 is idle. With the fulcrum pin 27 having its bearing in a plane parallel to the axis of the driven shaft 32, and the arms 39, 44, sufficiently spaced to be at opposite sides of the axis of the shaft 1, there is alternation in the thrusting or transmission effectiveness of the arms 39, 44. With but one arm in use, the driven shaft 32 is given a drive thrust spaced by a pause, while with plural arms the one direction of rotation for the driven shaft 32 as offset from the driving shaft axis direction and at a right angle thereto, is an approach to if not actually in continuous rotation. The settings given by the pin 11 positively fix the slant or inclination of the actuator disk 24 track, and thereby determine the extent of rocking for the intermittent grip device arms 39, 44. Inasmuch as the fulcrum 27 is eccentric to the drive shaft 1, the tilting of the disk 24 causes the disk to move bodily slightly toward this fulcrum. The working value of this factor is that the anti-friction rings 43 ride over a width extent on the endless track and thereby minimize occasion for wearing a groove in the track.

To the extent there is common subject-matter, this application is a continuation-in-part with applicant's co-pending case Serial Number 665,818 filed April 29, 1946, now Patent No. 2,461,732.

What is claimed and it is desired to secure by Letters Patent is:

1. A drive shaft, a driven shaft, an intermittent grip device mounted on the driven shaft, said device including a rock arm extending radially from the driven shaft, an endless track providing disk encircling the drive shaft, a fulcrum mounting for the disk eccentric of the drive shaft, means for rocking the disk on its fulcrum to shift the disk toward and from perpendicular plane relation to the drive shaft, said arm free end having a bearing, spring means normally directing the arm bearing to contact the disk track, and mounting means for effecting relative rotation between the disk and device for the rock positioned disk to oscillate the arm and actuate the driven shaft.

2. A drive shaft, a crank-providing fulcrum fixed on and in overhang spacing from the shaft, a driven shaft, a disk pivotally carried by the fulcrum and extending about the drive shaft, a control collar shiftable axially of the drive shaft, relatively rotatable connection between the collar and the disk coacting to hold the disk in a tilt relation about the drive shaft as the disk is held by the fulcrum to rotate with the drive shaft, and an intermittent grip device including pair of arms extending radially of and spaced along the driven shaft, each of said arms embracing the driven shaft in there having a bearing providing a rocking axis for such arm and said arms alternately having one way clutch connection with the shaft, said respective arms directly coacting with the disk.

FRED G. HANSEN.

REFERENCES CITED

The following references are of record in the file of this patent:

UNITED STATES PATENTS

| Number | Name | Date |
|---|---|---|
| 953,233 | Robinson | Mar. 29, 1910 |
| 2,396,410 | Blum | Mar. 12, 1946 |

FOREIGN PATENTS

| Number | Country | Date |
|---|---|---|
| 8,503 | Great Britain | Apr. 10, 1913 |
| 336,345 | France | Oct. 13, 1905 |
| 539,219 | France | Mar. 30, 1922 |